United States Patent [19]

Hudson

[11] 3,895,897
[45] July 22, 1975

[54] BLOW NEEDLE ASSEMBLY
[75] Inventor: Joseph F. Hudson, Royal Oak, Mich.
[73] Assignee: Monsanto Company, St. Louis, Mo.
[22] Filed: Mar. 4, 1974
[21] Appl. No.: 447,472

[52] U.S. Cl. .......................... 425/182; 425/DIG. 204
[51] Int. Cl. ............................................. B29d 23/03
[58] Field of Search ....... 425/DIG. 204, 387 B, 182, 425/DIG. 211

[56] References Cited
UNITED STATES PATENTS

| | | | |
|---|---|---|---|
| 3,025,561 | 3/1962 | Ruekberg et al. | 425/DIG. 211 |
| 3,632,262 | 1/1972 | Johnston | 425/387 B X |
| 3,796,531 | 3/1974 | Bowers | 425/DIG. 204 |
| 3,804,573 | 4/1974 | Del Piero | 425/DIG. 204 |
| 3,819,317 | 6/1974 | Higginbotham | 425/DIG. 204 |

FOREIGN PATENTS OR APPLICATIONS

| | | | |
|---|---|---|---|
| 2,093,183 | 1/1972 | France | 425/DIG. 204 |

Primary Examiner—Francis S. Husar
Assistant Examiner—David S. Safran
Attorney, Agent, or Firm—Michael J. Murphy

[57] ABSTRACT

An improved cylinder assembly for a blow needle for use in blow molding, which comprises a hollow stem carried within a piston rod portion having the blow needle on its forward end and being releasably secured at its rearward end to such rod portion, in order to facilitate removal and replacement of the needle without dismantling the rest of the assembly. The stem and piston rod are preferably quick-release connected by quick-disconnect coupling means to minimize downtime for needle maintenance. When used with molding machines of the vertical "wheel" type wherein the molds move radial to a horizontal axis during opening and closing, the improved assembly is especially adapted for mounting on the front face of the inner mold section closest to the axis of the machine at an acute angle to the mold parting line.

11 Claims, 4 Drawing Figures

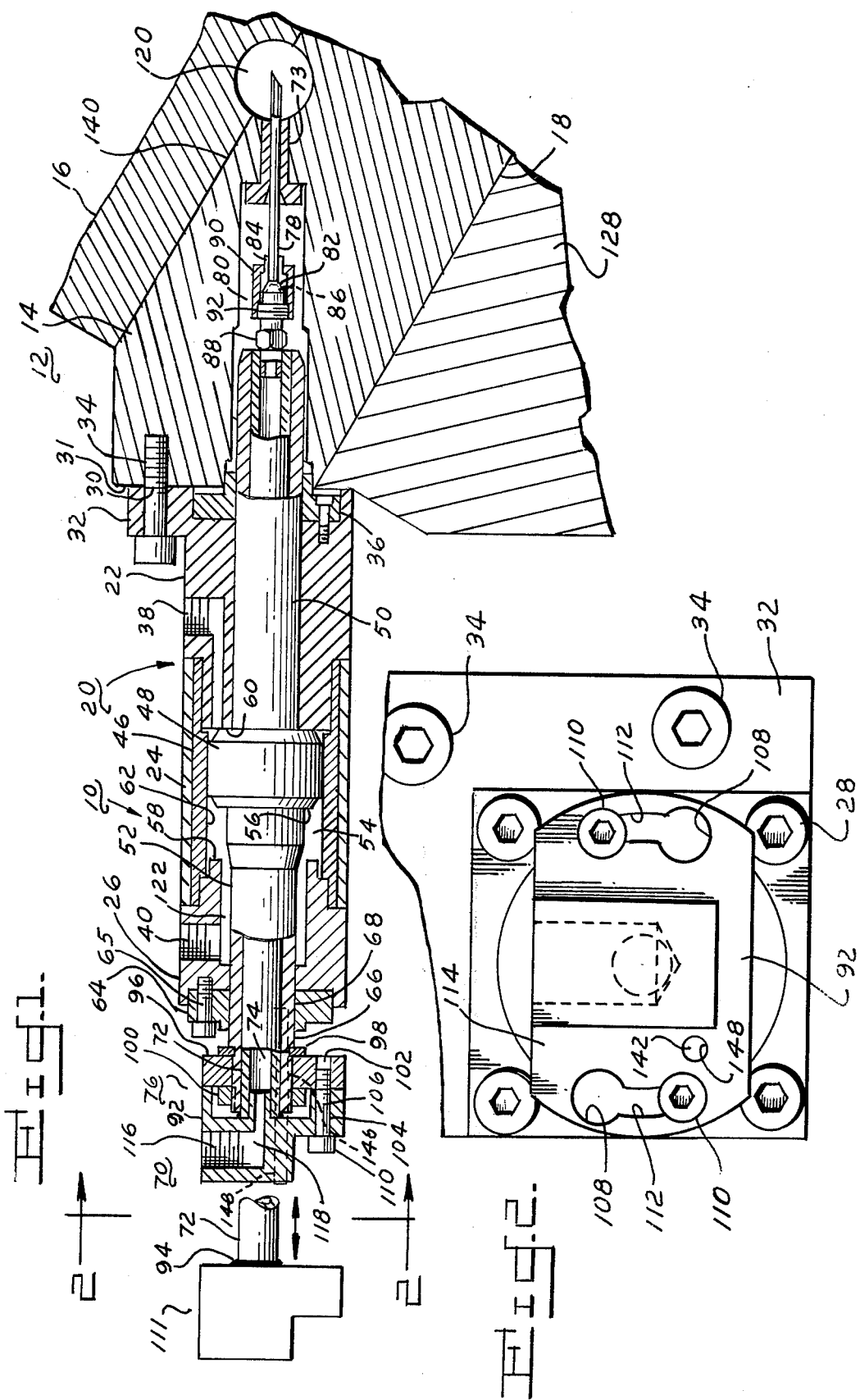

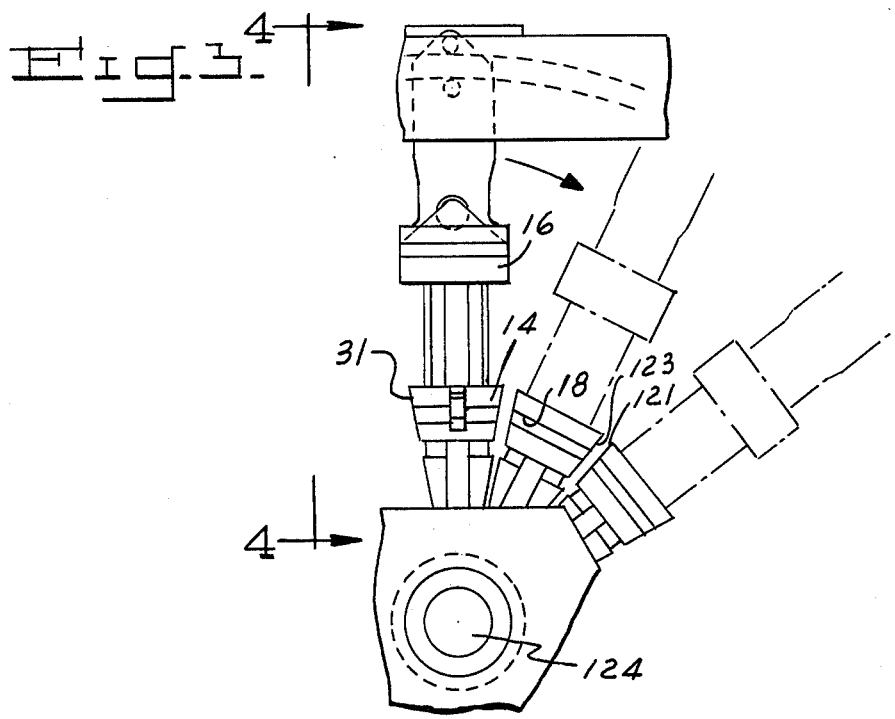
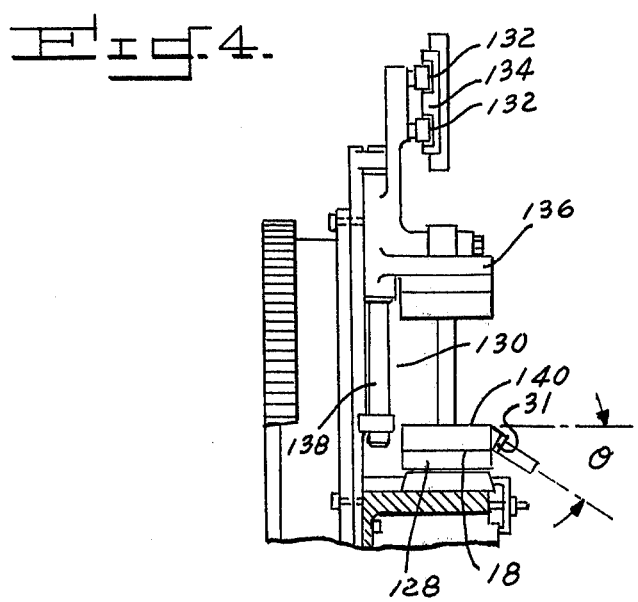

BLOW NEEDLE ASSEMBLY

BACKGROUND OF THE INVENTION

This invention relates to cylinder assemblies for needles used in blow molding machines, and particularly rotary blow molding machines of the wheel type wherein the molds move about a horizontal axis and open and close radial to such axis.

A form of blow molding well known in the art as typified by U.S. Pat. Nos. 2,784,452 and 3,310,834 (FIG. 15), involves puncturing the tubular plastic portion confined within the mold with a blow needle and thereafter expanding it outwardly into conformity with the mold cavity via air under pressure passing through the needle.

It is likewise known, as set forth in U.S. Pat. Nos. 3,513,502; 3,752,621 and 3,767,350 that the needle portion of the overall assembly used to blow the plastic in this manner can require frequent attention because, for example, of blunting or bending of the forward end after repeated use, such that it no longer functions in the intended manner. This problem is particularly acute when the plastics being processed are relatively rigid in nature. Easy access to such needles without holding the entire multi-station machine down for extended periods of time is therefore quite desirable. Though such just mentioned three patents function well in this last respect, they are not without some shortcomings. Thus, the '502 patent contemplates removal of the entire blow needle assembly from the mold in order to obtain access to the needle; the '621 patent provides for needle removal through the mold face along the parting line which, because of the necessary parts involved to permit this, diminishes the extent to which the mold may be cooled in the region of the cavity where such structure is located; and the '350 patent provides for removal of the needle through the opposite rear face of the mold, which in radial, wheel type machines is an extremely crowded area.

SUMMARY OF THE INVENTION

Now, however, there has been developed an improved structure which overcomes prior art deficiencies in blow needle assemblies.

Accordingly, it is a principal object of this invention to provide an improved cylinder assembly for use with a blow needle in a blow molding system.

Another object is to provide such an improved assembly which facilitates removal and replacement of the needle without requiring dismantling of the remaining portions of the assembly from their operative position with respect to the blow mold.

A further object is to provide an improved blow needle assembly with mechanism to facilitate quick removal and replacement of the needle with a minimum of downtime of the machine in which the molds and assemblies function.

An additional object is to provide a novel location for the blow needle assembly in rotary machines of the "wheel" type where the molds open and close radial to the wheel axis.

Other objects of this invention will in part be obvious and will in part appear hereinafter.

These and other objects are accomplished in a molding machine of the type including a split mold associated with a blow needle assembly comprising cylinder means and piston means reciprocable within the cylinder means, such piston means including a piston rod and hollow needle for puncturing and expanding tubular plastic material within the split mold by providing the improvement wherein the piston means comprises stem means including a hollow stem within and releasably secured to the piston rod having the blow needle on its forward end, whereby such needle may be removed from and replaced in the piston means without removing the piston rod therefrom.

Quick-disconnect coupling means are preferably used in joining the stem and piston rod, which includes a cap secured to the stem, a collar on the piston rod, alignable bores in the cap and collar, members movable in said bores for securing the cap and collar together, such members having enlarged portions along their lengths, openings through the end cap greater in size than such enlargements, and slots through the end cap interconnecting the openings with the bores therein. When the molding machine is the rotary wheel type wherein the sections move radial to the machine axis, the blow needle assemblies, such as those embodied by the present invention, are located in operative association with the front face of the inner section of each mold at an acute angle to the plane of separation of such sections.

BRIEF DESCRIPTION OF THE DRAWINGS

In describing the overall invention, reference will be made to the accompanying drawings wherein:

FIG. 1 is a central view, partly in section, through an assembly embodying the present invention showing parts in assembled position and their outline when in disassembled position;

FIG. 2 is a sectional view along 2—2 of FIG. 1; and

FIGS. 3 and 4 respectively are front and side views of a particular type of blow molding machine in which the assembly of FIGS. 1 and 2 is especially suited for use.

DETAILED DESCRIPTION OF ILLUSTRATED EMBODIMENTS

Referring now to the drawings, there is illustrated a blow needle assembly, generally identified as 10, for use with a split mold, which mold, in the illustrated embodiment, comprises partible sections 12 including inner member 14 and outer member 16, inner member 14 being supported on a block 128 by suitable conventional means such as bolts, not shown, entering its bottom side 18. Assembly 10 comprises cylinder means 20 which includes front section 22 closest inner mold section 14, center section 24 and rear section 26. Sections 24 and 26 are secured together by means such as bolts 28 (FIG. 2) whereas front section 22 is similarly secured to center section 24 by bolts (not shown) entering through vertical face 30 of front portion 22. Bolts 34 through suitable openings in flange 32 at the forward end of front portion 22 in turn secure previously assembled sections 22, 24 and 26 of the cylinder means to the opposite front face 31 of inner mold member 14. Each of portions 22, 24 and 26 are centrally bored so as to circumscribe a chamber in such three parts for additional portions of the assembly to be described hereafter. Wear bushing 36 is secured and seated in a recess in the forward face of front section 22 and slidably supports the forward portion of a piston rod, to be further described. Ports 38 and 40 are formed in front portion 22 and rear portion 26 respectively for admitting and discharging fluid such as lubricated air in a rather conventional manner to cause the piston portion of the assembly to reciprocate in chamber 54 of center section 24. Suitable piping and automatic control valving (not shown) may be provided in communication with ports 38 and 40 to cyclically supply to and vent pressurized air from such chamber 54. Replaceable liner 46 for slidably cooperating with the piston portion of the assembly may be press fitted within center portion 24. Though cylinder means 20 has been depicted as constituting a plurality of individual parts, it should be realized that a fewer number of parts or even a single member might be used.

Assembly 10 further comprises piston means within cylinder means 20 and includes, in the illustrated embodiment, a one-piece reciprocable member in the bore formed in sections 22, 24 and 26 comprising piston 48, elongated piston rod portion 50 forward of piston 48 and similar, elongated piston rod portion 52 rearward of piston 48. Though the piston-piston rod combination for purposes of simplicity is preferably formed in one-piece, it also may be formed of a plurality of parts when suitable reasons for so doing are indicated. Movement of piston 48 in chamber 54 is delimited by the abutment of cylindrical surface 56 against front face 58 of rear cylinder portion 26 on the one hand, and by abutment of cylindrical surface 60 against the opposing rear face of front cylinder portion 22 on the other hand. Bushing 64 seated in a recess and bolted at 65 on the back end of rear portion 26 of cylinder means 20 is centrally bored to cooperate with outer surface 66 of rear piston rod portion 52 in such manner as to act as a bearing surface therefor.

Piston 48 and piston rod portions 50 and 52 are likewise centrally axially bored to accept, as a further part of the overall piston means of the invention, stem means generally identified as 70. Stem means 70 includes elongated stem 72 having a length substantially equivalent to that of the combined length of the piston-piston rod combination. Stem 72 is hollow at 74 throughout such length and is releasably secured at its rear end, preferably via quick-disconnect coupling means generally indicated at 76, to the associated rear end of piston rod portion 52 in which it is positioned. Stem 72 has coaxial hollow needle 78 releasably positioned on its forward end 80. When in assembled condition, flared portion 82 of needle 78 is wedged via sleeve 84 against opposing tapered surface 86 of connector 88 by means of nut 90 threaded at 92 to the outer surface of connector 88. Alternatively, the needle portion of the assembly may comprise the actual forward end of stem 72. Stem 72 is secured to piston rod portion 52 by means of end cap 92 welded at 94 to stem member 72, which, when in assembled position, is opposite collar 96 held on the end of piston rod portion 52 by retaining ring 98 and threaded member 100 forcing collar 96 against ring 98. A pair of tapped bores 102 in collar 96 and 104 through end cap 92 are aligned with each other when in assembled condition so as to accept bolts 106 to releasably secure end cap 92 and collar 96 together. Quick-disconnect coupling means, which may take a variety of forms, are preferably provided in order to facilitate dismantling and reassembling stem 72 carrying blow needle 78 to piston rod portion 52, thereby minimizing downtime of the overall machine for purposes of maintaining such needle 78. In the illustrated embodiment, such quick-disconnect coupling means comprises a circular opening 108 (FIG. 2) through end cap 92 adjacent each bore 104, which is greater in diameter than that of the head portion 110 of each of the bolts 106. Arcuate slots 112, likewise extending through the thickness of end cap 92 interconnect bores 104 with the adjacent opening 108. Thus, when it is desired to inspect or change a blow needle 78, each of the two threaded bolts 106 are merely backed off a turn or two to disengage head portions 110 from the rear face 114 of end cap 92, and then end cap 92 is merely rotated counter-clockwise about 20° until bolt head portions 110 are coaxial with enlarged openings 108. Stem 72 carrying needle 78 may then be extracted through the axial bore in the piston-piston rod combination to expose the hollow needle for maintenance without necessitating disassembly of cylinder means 20 from the mold member 14 or of any of the parts of the piston means from such cylinder means. The outline of the disassembled stem 72 and needle 78 are shown at 111 in outline form in FIG. 1. Reassembly occurs in the reverse order. Stem 72 is reinserted in the bore of the piston and piston rod portions, bolt head portions 110 are positioned within enlarged openings 108, end cap 92 is rotated until such head portions are coaxial with bores 104 in the end cap, whereupon members 106 are tightened to draw the end cap and collar up snugly together.

End cap 92 preferably includes port 116 communicating via passage 118 with the hollow interior 74 of stem 72, to accommodate the blow air for expanding the tubular plastic within cavity 120 of the split mold. Though air for moving the piston 48 in the cylinder means and air for expanding the plastic may be provided from a common source, it is preferred that the air for generating piston movement be lubricated to minimize wear of the sliding parts and that air for expansion of the plastic be dry and non-lubricated to avoid contaminating the blown article.

Anti-rotation means may be provided comprising a dowel pin 142 secured to and extending rearwardly of bushing 64 through aligned openings 146 and 148 in collar 96 and end cap 92 respectively. Thus, when piston 48 reciprocates to the rear from the position illustrated in FIG. 1, collar 96 and end cap 92 (and necessarily all the parts carried thereby are prevented from rotating with respect to cylinder means 20 by rigid pin 142 captured in openings 146 and 148. Alternate means performing the same function may be provided such as, for example, a carriage bolt in one of portions 22, 24 or 26 of the cylinder means extending radial to the axis of the cylinder means having an end portion positioned within a slot formed in the surface of the piston or piston rod portion.

Also suitable seal rings may be conventionally used as required between the various moving parts of the piston means and the opposing portions of the cylinder means and have not been shown herein for purposes of clarity.

In operation, after mold sections 14 and 16 are closed on each other in a manner to be hereafter described to clamp off a tubular portion of plastic, not shown, pressurized air is admitted through port 40 and cylindrical recess 122 to force piston portion 48 forward against face 60, which in turn causes the needle 78 on the forward end of stem 72 which is secured via collar 96 to piston rod portion 52 to penetrate the plastic and assume the position of FIG. 1. Conventional synchronized actuating means then causes blow air to be admitted to the interior of the plastic via stem 72 and needle 78 to blow the article from the tubular plastic trapped within the mold cavity. After the plastic has cooled sufficiently within the mold, the blow air pressure is released, as is the pressure urging piston 48 forward; in like manner, pressure is then exerted via port 38 on piston 48 to urge it to the rear in chamber 54 thereby retracting needle 78 from the article and the mold cavity.

Turning now to FIG. 3, a blow molding machine is shown in outline form in which the just-described assembly 10 is especially suited for use. Such rotary molding machine includes a plurality of split molds each comprising an inner section 14 and outer section 16 as previously described, and which are arranged in angularly equispaced configuration about horizontal axis 124 and circumferentially close together to avoid generation of excess waste material between adjacent molds during operation of the machine. In such closely-adjacent position, the rear face 121 of each inner section 14 is located within an inch or so of the forward face 123 of the next adjacent inner section. Mold section 14 is supported on its bottom side 18 on support block 128 facing (FIG. 3) toward axis 124. As illustrated in FIG. 4, the particular means for moving outer section 16 toward and away from inner section 14 as the split molds move circularly around the machine, to a large extent are located in the area generally indicated as 130, to the rear of such sections, or in other words adjacent the rear faces thereof. Such means, well known in the art, include roller followers 132 cooperating with cam 134 to move brackets 136 carrying sections 16 radially toward and away from section 14 along rods 138. As is obvious from FIGS. 3 and 4, the available positions for locating a blow needle assembly for use with each of the split molds is quite limited in view of the necessary components involved in the basic operation of the machine. According to the invention, each blow needle assembly, which need not necessarily be of the form illustrated in FIGS. 1 and 2, is preferably operatively associated with front face 31 of each inner mold section 14 at an acute angle θ to the top side of inner member 14 or, in other words, to the plane 140 of separation of mold sections 14 and 16. As used herein "operatively associated" is meant to apply to an actual mounting of the blow needle assembly directly on the front face of the mold section or on an intermediate member which in turn is secured to such front face.

Though the embodiments illustrated herein have been described for use with a wheel rotary blow molding machine operable in a vertical plane, it should be realized that the invention with respect to the blow needle assembly is applicable to any type of blow molding machine utilizing a hollow blow needle and associated actuating mechanism.

The above description and particularly the drawings are set forth for purposes of illustration only and are not to be taken in a limited sense. Various modifications and alterations will be readily suggested to persons skilled in the art. It is intended, therefore, that the foregoing be considered as exemplary only and that the scope of the invention be ascertained from the following claims.

What is claimed is:

1. In a molding machine of the type including a split mold associated with a blow needle assembly comprising cylinder means and elongated piston means including a piston rod reciprocable within said cylinder means and a hollow needle reciprocable in a bore opening into a cavity formed in a section of said split mold at an angle to the parting line thereof for puncturing and expanding tubular plastic material within the split mold, the improvement wherein said piston means comprises stem means including an elongated hollow stem extending through said piston rod having said blow needle at its forward end, said stem means being releasably secured to said piston rod at the end opposite that having said blow needle, whereby said blow needle may be removed from and replaced in said piston means without removing the piston rod therefrom.

2. The apparatus of claim 1 wherein said stem means includes quick-disconnect coupling means securing the stem and piston rod together.

3. The apparatus of claim 1 including anti-rotation means for insuring coaxial alignment of the piston rod and cylinder means.

4. The apparatus of claim 1 wherein said blow needle is removably positioned on the forward end of the stem.

5. The apparatus of claim 2 wherein said quick-disconnect coupling means comprises:
   a. a cap secured to the stsm;
   b. a collar on the piston rod;
   c. alignable bores in the cap and collar;
   d. members movable in said bores for securing the cap and collar together, said members having enlarged portions along their lengths;
   e. openings through the end cap therein greater in size than said enlargements; and
   f. slots through the end cap interconnecting said openings with the bores therein.

6. The apparatus of claim 2 wherein said quick-disconnect coupling means includes a port for passage of blow air therethrough.

7. In a rotary molding machine of the type including split molds arranged closely adjacent each other in angularly equispaced configuration about a horizontal axis, such split molds including partible sections including an inner section supported in the machine on its bottom side facing said axis, means at least in part located immediately adjacent the rear of said sections for moving an outer section toward and away from its inner section in a direction radial to said axis, a blow needle assembly associated with each split mold comprising cylinder means, piston means mounted for reciprocable movement within said cylinder means, said piston means including a piston rod and a hollow needle for puncturing and expanding tubular plastic material within the split mold, the improvement wherein said cylinder means and piston means are operatively associated with the front face of each inner section at an acute angle to the plane of separation of said mold sections, said piston means comprising stem means including an elongated hollow stem extending through said piston rod having said hollow needle at its forward end, said stem means being releasably secured to said piston rod at the end opposite that having said blow needle.

8. The apparatus of claim 7 wherein said blow needle is removably positioned on the forward end of the stem.

9. The apparatus of claim 7 including anti-rotation means for insuring coaxial alignment of the piston rod and cylinder means.

10. The apparatus of claim 7 wherein said stem means includes quick-disconnect coupling means securing the stem and piston together.

11. The apparatus of claim 8 wherein said quick-disconnect coupling means comprises:
 a. a cap secured to the stem;
 b. a collar on the piston;
 c. alignable bores in the cap and collar;
 d. members movable in said bores for securing the cap and collar together, said members having enlarged portions along their lengths;
 e. openings through the end cap adjacent the bores therein greater in size than said enlargements; and
 f. slots through the end cap interconnecting said openings with the bores therein.

* * * * *